W. B. LASHAR.
CHAIN GRIP ATTACHING DEVICE.
APPLICATION FILED MAY 28, 1913. RENEWED JUNE 3, 1914.
1,103,064. Patented July 14, 1914.
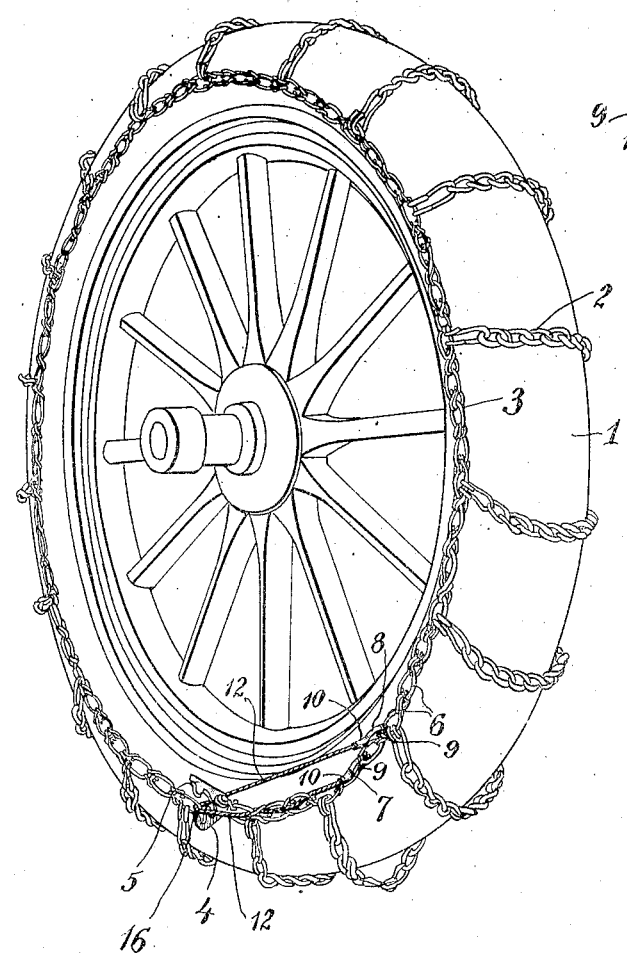
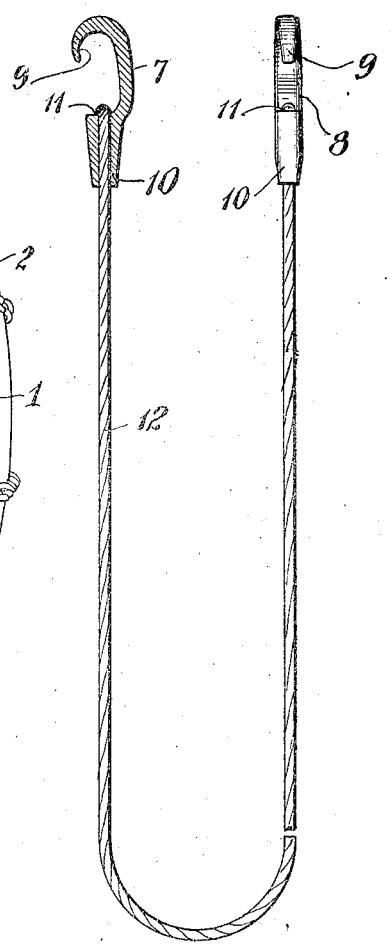
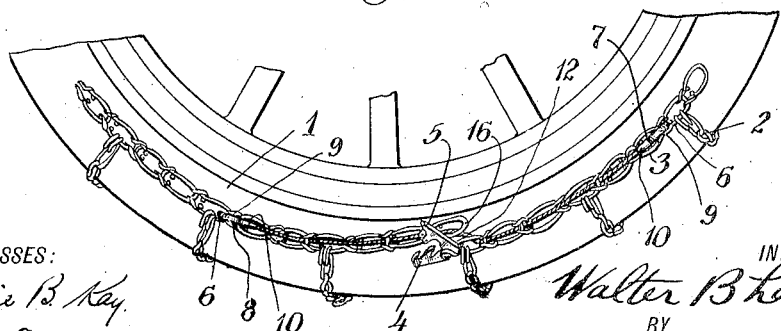
WITNESSES:
Jessie B. Kay
Charles Eberhart
INVENTOR
Walter B Lashar
BY
Duncan & Duncan ATTORNEYS

UNITED STATES PATENT OFFICE.

WALTER B. LASHAR, OF BRIDGEPORT, CONNECTICUT, ASSIGNOR TO WEED CHAIN TIRE GRIP COMPANY, OF BRIDGEPORT, CONNECTICUT, A CORPORATION OF NEW YORK.

CHAIN-GRIP-ATTACHING DEVICE.

1,103,064. Specification of Letters Patent. Patented July 14, 1914.

Application filed May 28, 1913, Serial No. 770,287. Renewed June 3, 1914. Serial No. 842,794.

*To all whom it may concern:*

Be it known that I, WALTER B. LASHAR, of Bridgeport, Fairfield county, Connecticut, have made a certain new and useful Invention Relating to Chain-Grip-Attaching Devices, of which the following is a specification, taken in connection with the accompanying drawing, which forms part of the same.

This invention relates especially to temporary attaching devices for use in more readily applying to automobile tires chain grips of the Parsons-Weed type.

The attaching device preferably comprises two flexible cables or attacher members having at one or both ends attacher hooks or grips to coöperate with the side chains and preferably narrow or small enough so as to be threaded through one or more of the links of the side chains to more effectively maintain their alinement.

In the accompanying drawing showing in a somewhat diagrammatic way an illustrative embodiment of this invention, Figure 1 is a perspective view of an automobile wheel to which a Parsons type chain grip has been temporarily secured by attaching devices. Fig. 2 shows a cable attacher; and Fig. 3 is a detail side view showing another arrangement of the attacher in effecting a temporary connection between the grip members.

As diagrammatically illustrated in the drawing the cross chains 2 and connected side chains 3 of the tire grip may be arranged on the pneumatic or other resilient tire 1 of the automobile in the usual way and it is in many cases convenient to lay the grip over the wheel so that its ends are adjacent the bottom of the wheel where they can be conveniently brought toward each other without special appliances so as to bring the grip into approximately its proper position on the wheel. As shown in Fig. 1, the end links, such as 16, of the side chains may thus be brought nearly up to the connector device or hook members 4, 5 on the other ends of these side chains, although in some instances it is hardly possible to bring these parts as close together in the first instance as indicated in the drawings, especially if the wheel is more or less embedded in sand or other soft material in the road.

In order to prevent delay and difficulty in attaching the grip it is quite desirable to use a flexible attacher which can be threaded through some of the side chain links at least to temporarily connect the ends of each side chain so that the grip can be used at once without waiting to get it in final adjusted position. A desirable attacher for this purpose may as indicated in Fig. 2 comprise an attacher member 12 of strong cord, or of twisted or woven wire cable having considerable strength and resiliency and also sufficient flexibility for this purpose. Any suitable attacher grips may be secured at one or both ends of the flexible cable or other attacher member to engage or coöperate with suitable portions of the side chains or other parts of the tire grip and hold them in position with sufficient security to allow the temporary operation of the grip. These attacher grips may be in the form of rigid metallic hooks and may with advantage comprise the narrow sockets 10 in which the ends 11 of the cable or flexible member 12 are secured in any desired way, the shanks 7 of these hooks being quite narrow as shown in connection with the hook 8 in Fig. 2, so that one or more of the hook ends 9 may be readily threaded through the links 6 of the side chains.

Fig. 1 shows one convenient form of attachment in which the grip or hook 7 has its point 9 hooked into one of the links of the side chain 3, the flexible attacher cable 12 being threaded through adjacent links sufficiently to prevent their getting out of lateral alinement. Then the connector is preferably passed through one of the links on the other end of this side chain such as the end link 16 thereof after which the end of this hook 8 may, if desired, be brought back and hooked into a link of the same end of the side chain which is engaged by the other hook. In this way the grip is held on the tire to sufficiently increase the traction of the vehicle to enable it to get out of difficult situations. The normal operation of the vehicle also tends to bring the chain grip held by the attacher into proper adjustment around the various parts of the tire and to enable the regular connector hooks to be fastened into the proper links of the other end of the side chains, as for instance, when this part of the tire grip is on the side or top of the wheel, so that the temporary attachers may then be disengaged from the grip. Fig. 3 shows another manner of using these flexible temporary attachers in which the end 9 of the hook 7 on the flexible attacher is hooked into one of the links 6 of the side chain 3 and then the cable threaded through the adjacent links of this side chain and through the links adjacent the other end of this side chain, so that the end 9 of the other hook 8 of this attacher may be hooked into a link 6 thereof and bring the ends of this side chain together to the extent desired. It is of course understood that the ends of both the side chains are connected in the first instance in the same way, such as indicated which can be conveniently done in the manner described without the necessity of jacking up the wheel or using other special devices to bring the tread chains under the operation of the wheel in direct engagement with the ground.

This invention has been described in connection with a number of illustrative embodiments, forms, proportions, parts, materials and arrangements, to the details of which disclosure the invention is not of course to be limited, since

What is claimed as new and what is desired to be secured by Letters Patent is set forth in the appended claims.

1. The combination with a vehicle wheel having a resilient tire, of a tire grip having tread chains and coöperating side chains each provided with connectors to connect their ends and a temporary attaching device for the ends of each of said side chains comprising a flexible attacher cable and narrow rigid hooks permanently connected to both ends of said cable, said hooks being hooked into links on one end of said side chains and said cable being threaded through links adjacent both ends of said side chains to maintain substantial alinement thereof.

2. The combination with a vehicle wheel having a resilient tire, of a tire grip having tread members and coöperating side members each provided with connectors to connect their ends and a temporary attaching device for the ends of each of said side members comprising a flexible attacher and attacher grips permanently connected to both ends thereof, the attacher grips engaging in said side members and said attacher being threaded through portions of said side members adjacent their ends to maintain substantial alinement thereof.

3. The combination with a vehicle wheel having a resilient tire, of a tire grip having tread chains and coöperating side chains each provided with connectors to connect their ends and a temporary attaching device for the ends of said side chains comprising a flexible attacher and gripping means connected thereto, said attacher and gripping means coöperating with the side chain ends and said attacher being threaded through said grip chains to hold the grip in operative position on the tread of the tire.

WALTER B. LASHAR.

Witnesses:
ELLA F. GANLEY,
CATHERINE I. CARROLL.